United States Patent [19]

Akiyama et al.

[11] Patent Number: 4,813,518
[45] Date of Patent: Mar. 21, 1989

[54] BRAKE RELEASE MECHANISM

[75] Inventors: Teruo Akiyama, Yokohama; Koichi Morita, Kamakura, both of Japan

[73] Assignee: Kabushiki Kaisha Komatsu Seisakusho, Tokyo, Japan

[21] Appl. No.: 443,114

[22] Filed: Nov. 19, 1982

[30] Foreign Application Priority Data

Nov. 19, 1981 [JP] Japan .................. 56-171378[U]

[51] Int. Cl.$^4$ ..................... F16D 65/24; B60T 13/00
[52] U.S. Cl. ..................... 188/170; 303/9.76
[58] Field of Search .............. 192/4 A, 3 R, 3 N, 3 S, 192/3 TR, 3.51, 3.63, 1.35; 303/71, 6 M, 9.76

[56] References Cited

U.S. PATENT DOCUMENTS

| 3,854,559 | 12/1974 | Talak et al. | 192/4 A |
| 3,976,333 | 8/1976 | Fillion et al. | 188/170 |
| 4,195,716 | 4/1980 | Wirt | 192/4 A |
| 4,279,334 | 7/1981 | Plate et al. | 192/4 A |
| 4,406,354 | 9/1983 | Barsted | 192/3 N |

FOREIGN PATENT DOCUMENTS

| 2135279 | 12/1979 | Fed. Rep. of Germany | 192/4 A |
| 0008325 | 1/1979 | Japan | 192/4 A |
| 0167903 | 12/1981 | Japan | 192/3 R |

Primary Examiner—Andres Kashnikow
Assistant Examiner—Robert J. Oberleitner
Attorney, Agent, or Firm—Armstrong, Nikaido Marmelstein & Kubovcik

[57] ABSTRACT

A brake release mechanism for a spring-loaded, normally applied vehicle brake releasable by system hydraulic pressure when the system is disabled includes a pilot-operated brake release valve for isolating the brake from the disabled system, a brake control valve disposed between the system and the brake, and a manual hydraulic pump communicating with the brake for supplying fluid pressure thereto. A pilot-operated shunt valve is provided for shunting a hydraulic motor associated with the brake to allow free turning thereof during towing.

2 Claims, 1 Drawing Sheet

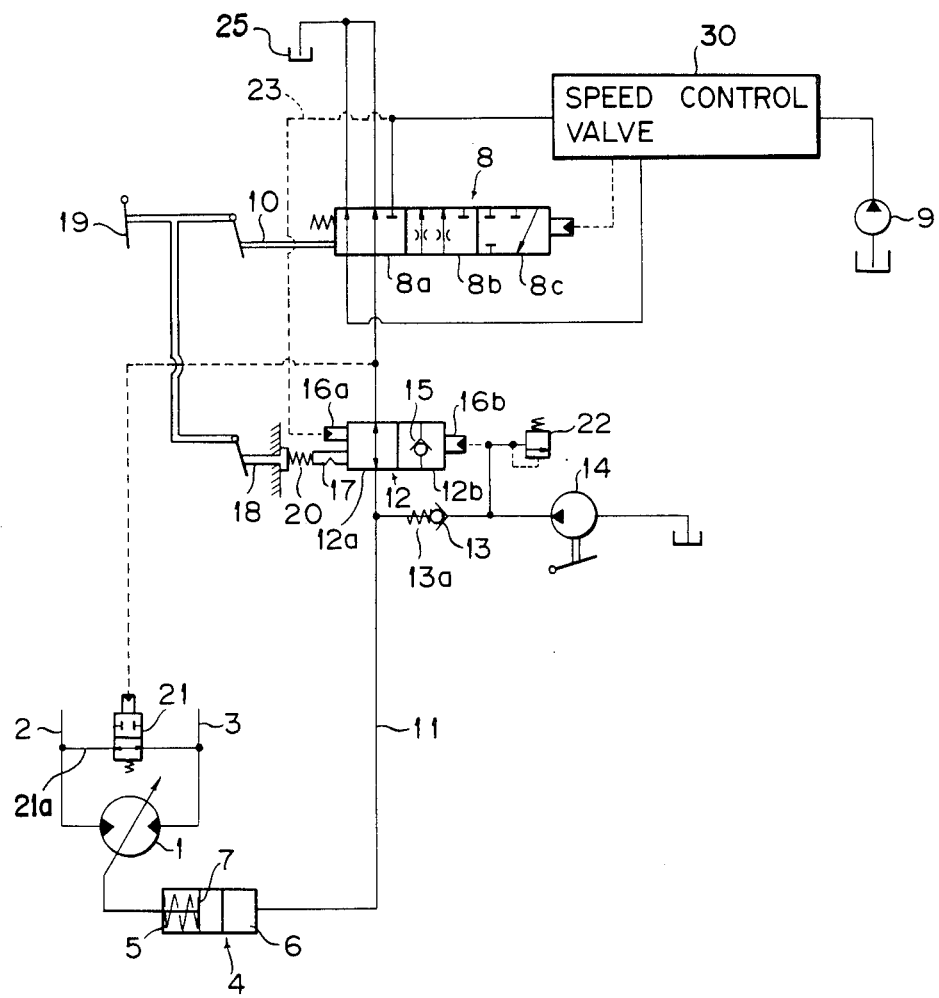

BRAKE RELEASE MECHANISM

BACKGROUND OF THE INVENTION

This invention relates to a brake release mechanism for manually releasing the brake of a hydraulic motor for a hydrostatic transmission arranged to be actuated by the force of a spring and released by a fluid pressure applied thereon.

The brake for hydraulic motor of the kind specified is arranged to be actuated automatically when the supply of fluid pressure is interrupted by stopping an engine.

Under such a condition, however, the vehicle body cannot be towed, and therefore it is required to operate a brake release mechanism separately so as to release the brake.

A conventional brake release mechanism is disclosed, for example, in U.S. Pat. No. 4,195,716.

The above-mentioned prior art brake release mechanism is arranged to supply the fluid pressure into the cylinder of the brake by means of a manual pump to thereby release the brake and is also arranged, when actuating the brake again, to open a drain valve installed in the fluid conduit connected between the manual pump and the brake cylinder so as to drain the fluid pressure thereby actuating the brake.

For this reason, in the case the above-mentioned brake release mechanism is employed, it is necessary for the operator to select either of brake releasing condition or brake actuated condition, and therefore it is impossible to control the braking operation delicately when the vehicle is being towed.

SUMMARY OF THE INVENTION

It is therefore an object of the present invention to provide an improved brake release mechanism for hydraulically releasing normally applied brakes for towing a vehicle upon failure of the vehicle hydraulic system pressure which overcomes the above noted problems of the prior art.

Another object of the present invention is to provide a mechanism for applying hydraulically released brakes when towing a vehicle.

A further object of the present invention is to provide a means for shunting a vehicle hydraulic motor upon failure of the vehicle hydraulic system fluid pressure to allow towing a vehicle.

A still further object of the present invention is to provide a brake release mechanism for towing a vehicle which can prevent an abnormally high fluid pressure from being developed in a brake releasing circuit.

In accordance with an aspect of the present invention, there is provided a brake release mechanism for a vehicle including a hydraulic drive motor having a fluid inlet line and a fluid outlet line, a spring applied brake associated with said drive motor and releasable by hydraulic fluid pressure, and pressurized hydraulic system means for communicating fluid pressure to said brake for releasing said brake, said mechanism comprising: brake control valve means disposed between said pressurized hydraulic system means and said brake, said brake control valve means being manually operated for selectively connecting said brake with said pressurized hydraulic system means and a tank; pilot-operated brake release valve means connected between said brake and said brake control valve means, said brake release valve means having a communication position where communication between said brake and said brake control valve means is established and an offset position where fluid in said brake is not allowed to flow from said brake to said brake control valve means and being normally held in the communication position; auxiliary conduit means connected between said brake and said brake release valve means for communicating fluid pressure with said brake; manual hydraulic pump means for pumping fluid through said auxiliary conduit means to said brake; and means for shunting hydraulic fluid across said motor.

The above and other objects, features and advantages of the present invention will be readily apparent from the following description taken in conjunction with the accompanying drawing.

BRIEF DESCRIPTION OF THE DRAWING

The sole FIGURE is a schematic drawing showing a hydraulic circuit of a brake release mechanism according to the present invention.

DESCRIPTION OF THE PREFERRED EMBODIMENT

The present invention will now be described below by way of example only with reference to the accompanying drawing.

In the drawing, reference numeral 1 denotes a hydraulic motor which is connected through fluid inlet and outlet conduits 2 and 3 forming a closed loop to a hydraulic pump not shown. Reference numeral 4 denotes a brake operatively associated with the hydraulic motor 1. This brake 4 serves as a parking brake in the case where the hydraulic motor 1 is connected to drive wheels of a vehicle. This brake 4 is of a well known type wherein a brake action is caused by the resilient force of a spring 5 and the braking force thus created can be released by supplying pressurized fluid into a cylinder 6 so as to actuate a piston 7 therein against the biasing force of the spring 5. The cylinder 6 of the brake 4 is connected through a brake control valve 8 with a pressurized system pressure or a fluid pressure supply source such as a charge pump 9. The brake control valve 8 has a braking position 8a, inching position 8b and a brake releasing position 8c, and its arrangement is made such that operation of an actuating member 10 enables the brake 4 to be actuated, inched or released according to the position of the brake control valve 8. In addition to the manual operation, the brake control valve 8 can be pilot-operated. When the pump 9 is being driven by the engine and a speed control valve 30 is shifted either to forward drive or reverse drive position, the fluid pressure is introduced into the brake control valve 8 through a pilot port to thereby urge the brake control valve to the brake releasing position 8c.

A brake release valve 12 is interposed in a brake circuit 11 connecting the cylinder 6 of the brake 4 and the brake control valve 8. Further, the delivery side of a manual pump 14 is connected through a check valve 13 with the brake circuit 11 between the brake release valve 12 and the cylinder 6. The brake release valve 12 has a communication position 12a and a nonreturn or one way position 12b in which is interposed a check valve 15 which serves to permit only the flow of fluid towards the cylinder 6 and which has pilot actuating sections 16a and 16b on both sides thereof. The pilot actuating section 16b on the side of the nonreturn position 12b is connected to the delivery side of the manual pump 14. Although in the illustrated embodiment, the brake release valve 12 has the one way position 12b having the check valve 15 mounted therein, this can be replaced by a closed position. The brake release valve 12 has a detent or holding means 17 adapted to hold the valve 12 at its nonreturn position 12b. The detent 17 is arranged to be released by pushing a rod 18 so that the brake release valve 12 may be held at its communication position 12a.

Reference numeral 19 denotes a brake lever which is connected with the actuating member 10 of the brake control valve 8 and with the rod 18 of the brake release valve 12. By operating the brake lever 19, the brake control valve 8 is changed over to any of the braking position 8a, the inching position 8b and the brake releasing position 8c. Further, an interlocking arrangement is taken between the brake control valve 8 and the brake release valve 12 so that when the brake control valve 8 is shifted either to the braking position 8a or inching position 8b by operating the brake lever 19, the brake release valve 12 may occupy its communication position 12a. The brake release valve 12 is normally biased by a spring 20 to the communication position 12a. The resilient force of the spring 20 is less than that of a spring 13a of a check valve 13 installed on the delivery side of the manual pump 14.

Reference numeral 21 indicates a shunt valve interposed between the inlet and outlet conduits 2 and 3 of the hydraulic motor 1 and which has communication and blocking positions. This shunt valve 21 is arranged to be held at its communication position by the action of its spring and held at its blocking position by the action of a pilot fluid pressure and has shunt conduit means 21a communicating with conduits 2 and 3. The shunt valve 21 has a pilot actuating section connected with a fluid circuit between the brake control valve 8 and the brake release valve 12.

Reference numeral 22 denotes a relief valve connected to the delivery side of the manual pump 14.

Further, reference numeral 23 indicates an auxiliary fluid circuit provided to ensure that the brake release valve 12 is held at its communication position 12a under the normal operation.

In the aforementioned arrangement, when the supply of the fluid by the fluid pressure supply source is interrupted by an engine trouble or killing of the engine, the brake 4 is rendered operative by the action of the spring 5 so as to apply a braking force on the hydraulic motor 1.

Therefore, when the vehicle is to be moved under this condition, it is required to release the brake 4.

In such a case, the manual pump 14 is operated. Thus, the brake release valve 12 is switched over to its nonreturn position 12b by the action of the fluid pressure delivered by the pump 14 and this condition is maintained by the detent 17. When the manual pump 14 is operated further,, the check valve 13 will open to allow the pressurized fluid delivered by the manual pump 14 to flow through the brake circuit 11 into the cylinder 6 of the brake 4 to thereby release the brake 4 against the biasing force of the spring 5.

Because, at that time, the brake release valve 12 is held at its nonreturn position 12b by the detent 17, the fluid pressure is not supplied into the brake control valve 8 by the action of the check valve 15 located in the nonreturn position 12b so that the shunt valve 21 may occupy its communication position.

Therefore, the hydraulic motor 1 can be freely rotated by applying an external force so that the vehicle can be towed.

When the hydraulic motor 1 is rotated by an external force applied thereon; that is, the vehicle is being towed, the braking operation same as that when the vehicle is normally run can be made by operating the brake lever 19.

In brief, by shifting the brake lever 19 over to the inching position or the braking position, the brake release valve 12 will be located at its communication position 12a by releasing the detent 17 so that the pressurized fluid in the cylinder 6 of the brake 4 may flow through the brake control valve 8 into the drain 25 thereby actuating the brake 4. At that time, the pressurized fluid to be drained is controlled by the brake control valve 8, and therefore the braking force then applied can be properly controlled.

Further, if and when the pump 14 is operated excessively to cause an abnormal pressure in the brake circuit 11, then the relief valve 22 will open to relieve it.

As described in detail hereinabove, according to the present invention not only the brake 4 of the hydraulic motor 1 can be released by operating the manual pump 14, but also when the vehicle is being towed with its brake released, braking operation same as that when the vehicle is normally run can be made by operating the brake control valve 8. Moreover, when the brake is released by means of the manual pump 14, the fluid pressure delivered by the manual pump 14 can be controlled by way of the relief valve 22, and therefore it is possible to prevent the generation of an abnormal pressure in the brake circuit when the brake is released manually.

It is to be understood that the above description is by way of example only, and that details for carrying out the invention into effect may be varied without departing from the scope of the invention claimed.

What is claimed is:

1. A brake release mechanism for a vehicle including a hydraulic drive motor having a fluid inlet line and a fluid outlet line, a spring applied brake associated with said drive motor and releasable by hydraulic fluid pressure, and pressurized hydraulic system means for communicating fluid pressure to said brake for releasing said brake, said mechanism comprising:
   brake control valve means, disposed between said pressurized hydraulic system means and said brake and being manually operated for selectively connecting said brake with said pressurized hydraulic system means and a tank;
   pilot-operated brake release valve means connected between said brake and said brake control valve means, said brake release valve means having a communication position where communication between said brake and said brake control valve means is established and an offset position where fluid in said brake is not allowed to flow from said brake to said brake control valve means and being normally held in the communication position;
   auxiliary conduit means connected between said brake and said brake release valve means for communicating fluid pressure with said brake;
   manual hydraulic pump means for pumping fluid through said auxiliary conduit means to said brake; and
   means for shunting hydraulic fluid across said motor, and wherein said brake release valve means includes detent means for holding the same in the offset position when fluid pressure in said auxiliary conduit means urges said brake release valve means to shift to the communication position.

2. A brake release mechanism as recited in claim 1 further comprising means for releasing said detent means, interlocking means for interlocking movements of said brake control valve means and said brake release valve means such that when said brake control valve means is shifted either to a brake position or to an inching position said brake release valve means is shifted to the communication position by releasing said detent means with said detent releasing means, and means for manually operating said interlocking means.

* * * * *